United States Patent [19]

Temple, Jr. et al.

[11] Patent Number: 5,348,586
[45] Date of Patent: Sep. 20, 1994

[54] RIBBON PREWET SYSTEM

[75] Inventors: Kenneth D. Temple, Jr., Newton; Keith D. Church, Catawba, both of N.C.

[73] Assignee: Siecor Corporation, Hickory, N.C.

[21] Appl. No.: 143,012

[22] Filed: Oct. 29, 1993

[51] Int. Cl.$^5$ .................. B05C 3/02; B29D 11/00
[52] U.S. Cl. ..................... 118/405; 118/419; 118/420; 264/1.28; 385/114; 385/115; 385/116
[58] Field of Search ............... 118/77, 234, 405, 419, 118/420; 385/114, 115, 116, 128; 264/1.5

[56] References Cited

U.S. PATENT DOCUMENTS

| | | | |
|---|---|---|---|
| 3,832,215 | 8/1974 | Franke, Jr. et al. | 117/61 |
| 4,042,360 | 8/1977 | Kane et al. | 65/11 W |
| 4,078,853 | 3/1978 | Kempf et al. | 385/114 |
| 4,129,468 | 12/1978 | Knab | 156/148 |
| 4,194,462 | 3/1980 | Knowles | 118/405 |
| 4,267,007 | 5/1981 | Kellogg | 156/425 |
| 4,305,642 | 12/1981 | Bloodworth et al. | 350/96.20 |
| 4,688,891 | 8/1987 | Carratt et al. | 350/96.24 |
| 4,737,215 | 4/1988 | Stoffels et al. | 156/166 |
| 4,767,184 | 8/1988 | Ogasawara et al. | 385/105 |
| 4,775,434 | 10/1988 | Rolston | 156/425 |
| 4,840,454 | 6/1989 | Mayr | 385/109 |
| 4,980,012 | 12/1990 | Nieda et al. | 156/441 |
| 4,985,185 | 1/1991 | Mayr et al. | 264/1.5 |
| 5,082,348 | 1/1992 | Gartside, III et al. | 385/111 |
| 5,082,380 | 1/1992 | Sutehall et al. | 385/114 |
| 5,084,221 | 1/1992 | Matsuno et al. | 264/103 |
| 5,092,264 | 3/1992 | Overton et al. | 118/50.1 |
| 5,120,388 | 6/1992 | Knott | 156/294 |
| 5,185,846 | 2/1993 | Basavanhally et al. | 385/137 |

Primary Examiner—James C. Housel
Assistant Examiner—Harold Y. Pyon
Attorney, Agent, or Firm—J. David Abernethy

[57] ABSTRACT

Apparatus for applying filling compound or the like to a rotating optical ribbon stack comprising a stationary bearing through which a viscous substance is applied under pressure, a rotatable journal, and a ribbon wiping die secured within the journal through which a light waveguide ribbon stack may be passed.

2 Claims, 3 Drawing Sheets

RIBBON PREWET SYSTEM

BACKGROUND OF THE INVENTION

The present invention is directed to apparatus for supplying a viscous substance to the surface of a stack of rotating light waveguide ribbons.

It is desirable in many instances to supply a viscous substance, such as a filling compound, to light waveguides prior to the extrusion of an external jacket. For example, U.S. Pat. No. 4,840,454, assigned to Siemens AG, discloses a liquid resin which emerges through a nozzle which lies immediately ahead of a stranding nipple which simultaneously serves as a stripping means to assure that only slightly more than the outside contour of a light waveguide bundle is filled up by the liquid resin. The light waveguides may be SZ stranded.

SUMMARY OF THE INVENTION

The object of the present invention is to provide a wiping die for coating optical ribbons in with a viscous substance before they are formed into a light waveguide ribbon stack.

This object is obtained in the apparatus according to the present invention, in which a viscous filling compound is supplied under pressure to openings in a stationary bearing which contains a rotatable journal therein. Secured in the journal is a light waveguide ribbon wiping die, which is also thereby rotatable. The light waveguide ribbon wiping die contains a series of parallel passages which are flared at opposing terminal ends. A set of light waveguide ribbons passes through the wiping die and the viscous substance is applied to each ribbon in a thin coating as each ribbon passes through a passage in the wiping die. The optical ribbons are then directed together to form a single light waveguide ribbon stack which has the viscous substance between each optical ribbon of the stack without unwanted air gaps therebetween.

DETAILED DESCRIPTION OF THE PREFERRED EMBODIMENT

Figure 1:
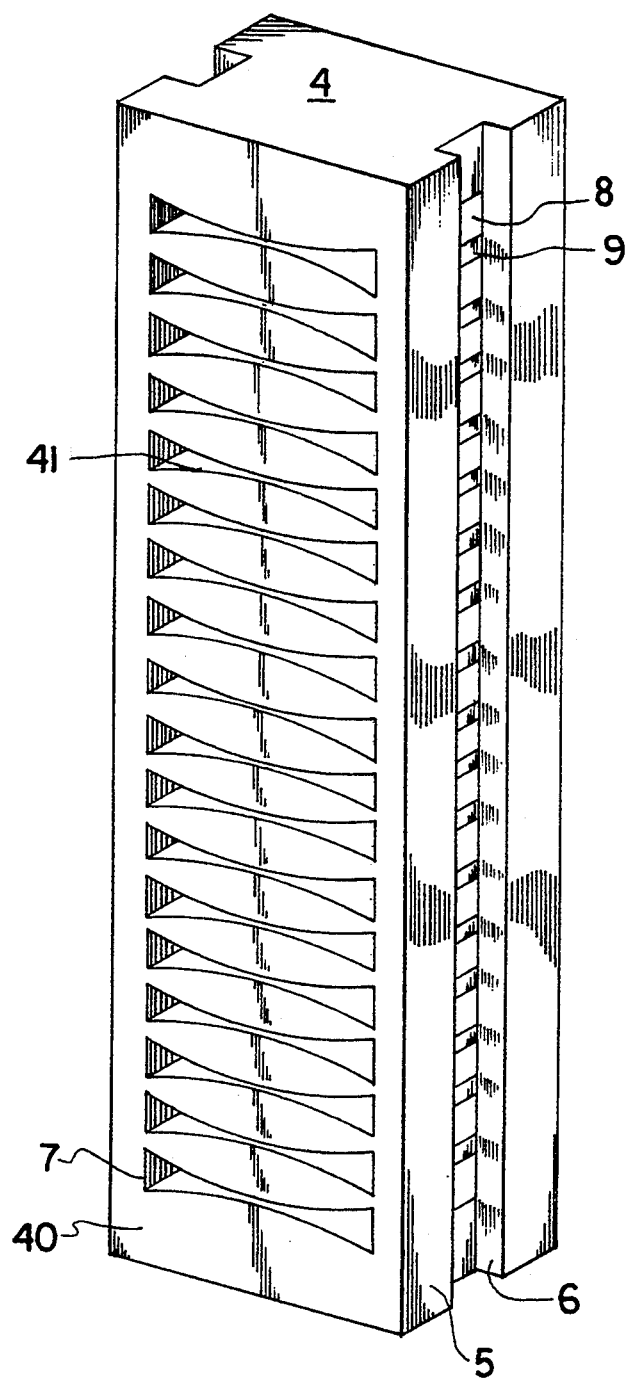
FIG. 1 is a perspective view of a light waveguide ribbon stack wiping die.

A perspective view of ribbon wiping die 4 is shown in FIG. 1. Wiping die 4 is a steel block having a wide face 40 and a narrow face 5. Narrow face 5 has a channel 6 in the middle thereof in communication with a series of passages 41 separated by solid elements 9. Passages 41 are flared at opposing terminal ends 8, 7. In use, a light waveguide ribbon will enter a passage 41 at flared end 8, proceed through the narrow portion in the middle of the passage, and exit at the opposing flared end 7 of such passage. The three faces of die 4 not in view are in all respects the same as the opposing face which is in view in FIG. 1.

Figure 2:
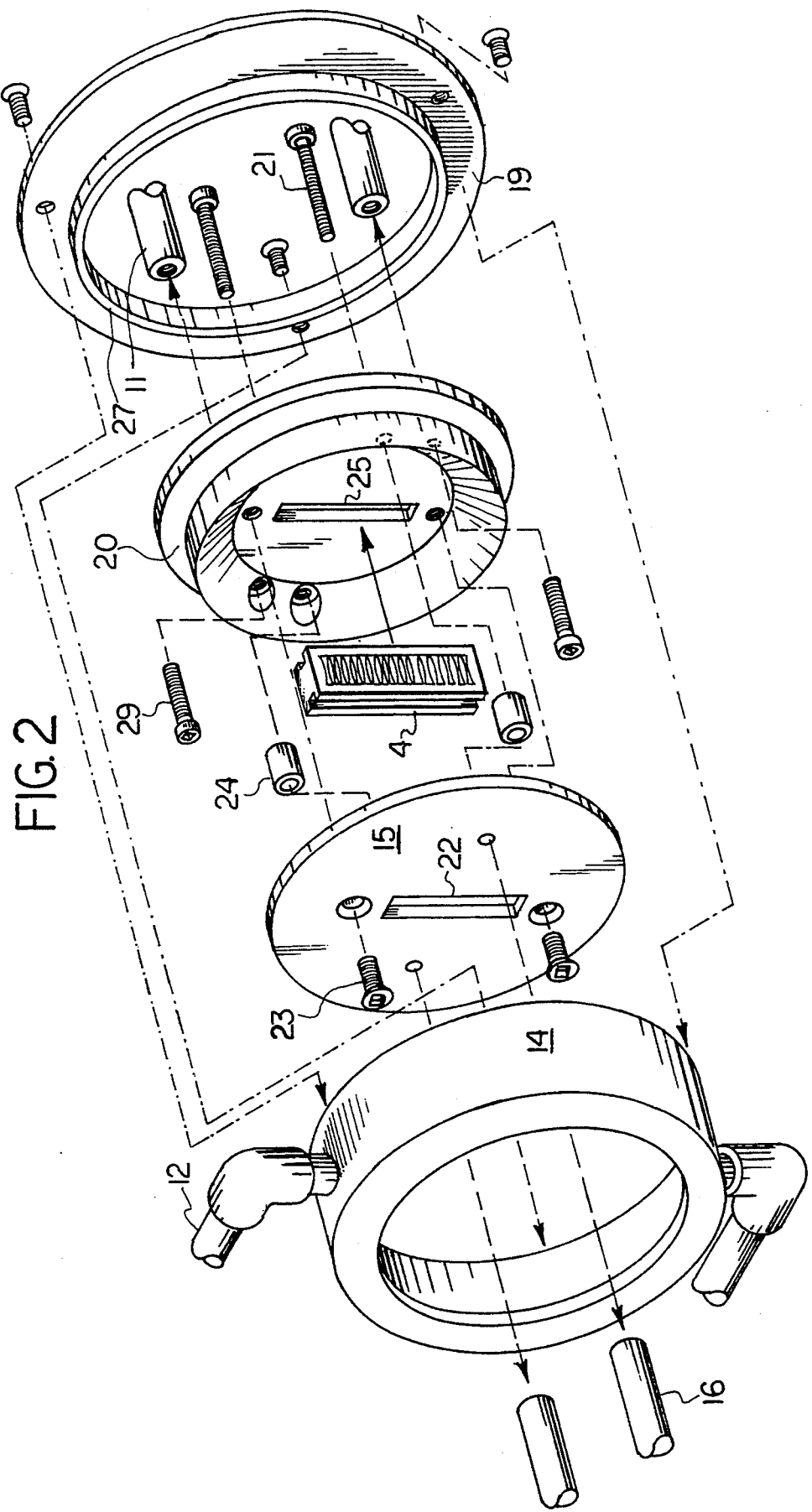
FIG. 2 is a perspective view of the assembly of the elements of the journal and the bearings; and, FIG. 3 is a perspective view of the light waveguide ribbon stack manufacturing line in the vicinity of the rotating journal and wiping die.
Figure 3:
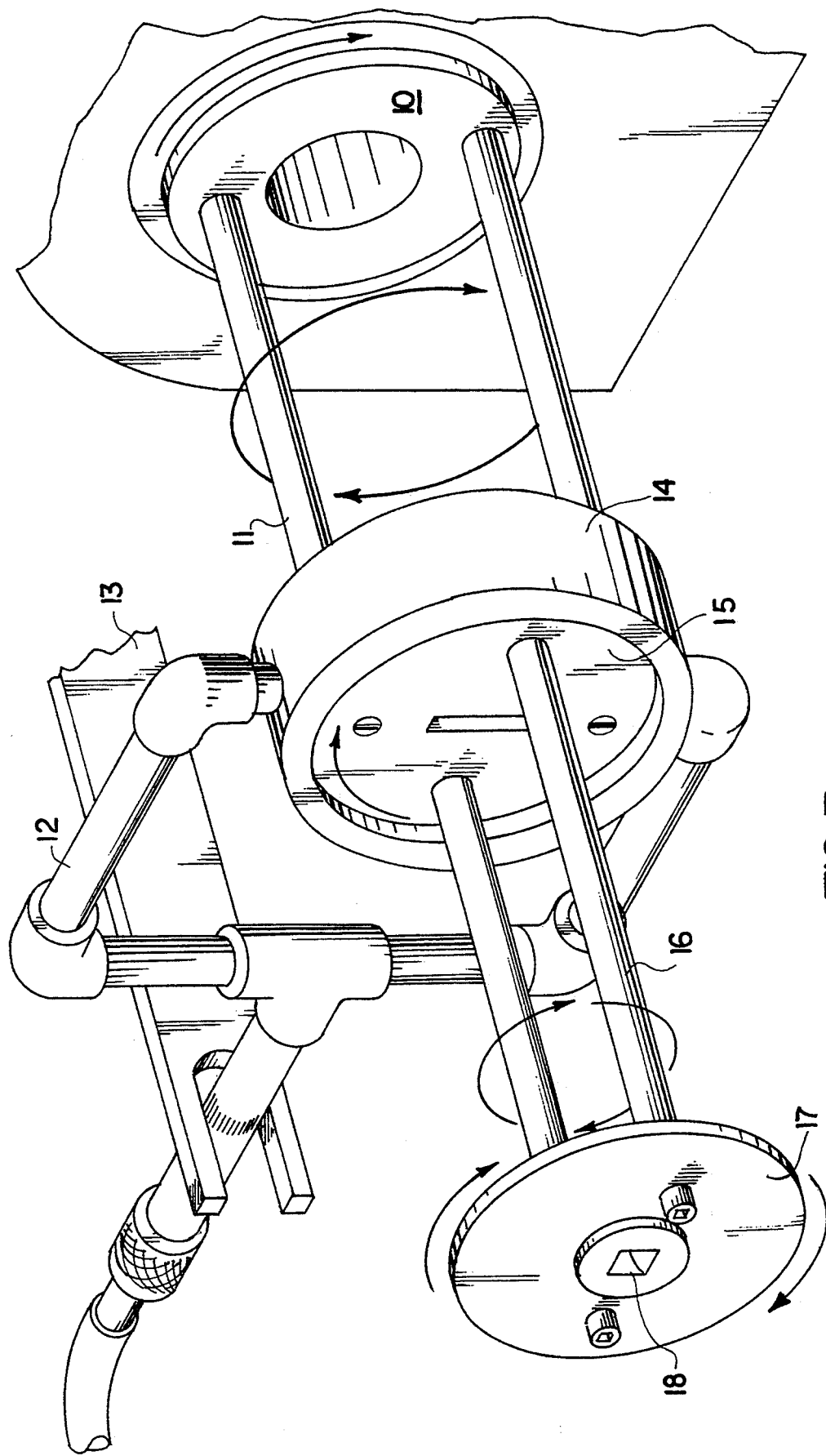

The wiping die is seated in a journal and bearing which are part of a light waveguide ribbon manufacturing line as shown in FIGS. 2, 3. A plurality of light waveguide ribbons emerge from rotating payoffs 10. Payoff 10 may alternatively rotate in opposite directions if SZ stranding is desired. Rods 11 mounted to payoff 10 are secured to journal 20 by screws 29. Plate 15 is mounted to journal 20 by screws 23. Die 4 is seated in and between entrance slot 25 in journal 20 and exit slot 22 in plate 15. Ledges in slots 22, 25, hold die 4 in its desired position. Plate 17 is mounted to rods 16 which are secured to journal 20 by means of screws 21.

Spacers 24 are fitted on screws 21 between journal 20 and plate 15. The dimensions of spacers 24, journal 20 and plate 15 are such that a gap is left between plate 15 and journal 20. Through this gap flows the viscous filling compound from pipe 12. The filling compound is directed to the entrance side 8 of each passage by the inwardly beveled interior of journal 20.

Beating 14 is mechanically held stationary by means of retaining bar 13. Journal 20 and plate 15 are held within stationary beating 14 and beating cap 19 having ledge 27 thereon. While bearing 14 and cap 19 remain stationary, payoff 10, rods 11, journal 20, plate 15, rods 16, and plate 17 all rotate together.

A plurality of light waveguide ribbons emerge through the bore of payoff 10, and proceed through slot 25, passages 41 of die 4, and slot 22, and then are closed into a stack by means of closing die 18.

All elements of the apparatus above described are rigid and are metallic. Beating 14 and cap 19 may be brass, while the remaining parts of the apparatus are steel.

As an example, die 4 was manufactured to have a height of 2.7 inches, a width of 0.75 inches, and a thickness of 0.5 inches. An individual passage 41 in die 4 had a length of 0.563 inches, and a height of 0.021 inches at its midpoint and 0.095 inches at either flared terminal end.

What is claimed is:

1. Apparatus for applying a viscous substance to a group of rotating optical ribbons, comprising:
   a stationary bearing having at least one opening through which a viscous substance is supplied under pressure;
   a rotatable journal held within the bearing, said journal having means for securing a ribbon wiping die inserted in the journal;
   means for rotating the journal; and,
   a ribbon wiping die secured within the journal, the wiping die having a plurality of passages therein through each of which a fight waveguide ribbon may be passed.

2. Apparatus is described in claim 1, wherein the wiping die passages are in parallel relationship with one another and are flared to spread outwardly at opposing terminal ends.

* * * * *